United States Patent [19]

Osborn

[11] 4,077,273
[45] Mar. 7, 1978

[54] SUPPORTED PIN-TYPE GEAR STRUCTURE
[76] Inventor: Merritt A. Osborn, 8706 Cedar Rd., Chesterland, Ohio 44026
[21] Appl. No.: 715,988
[22] Filed: Aug. 19, 1976
[51] Int. Cl.² .............................................. F16H 1/06
[52] U.S. Cl. .......................................... 74/415; 74/413
[58] Field of Search ................................. 74/413, 415

[56] References Cited
U.S. PATENT DOCUMENTS

| | | | |
|---|---|---|---|
| 1,914,797 | 6/1933 | Baker | 74/415 |
| 2,070,777 | 2/1937 | Benbow | 74/415 |
| 2,293,907 | 8/1942 | Le Bus | 74/415 |
| 3,611,822 | 10/1971 | Sanderson | 74/413 X |

Primary Examiner—Leonard H. Gerin

[57] ABSTRACT

A supported pin-type gear structure is disclosed wherein a plurality of pin-means are provided in a circumferentially and radially spaced pattern around the flat face of a supporting element. The pins extend from the face of the element, and the free ends of at least two adjacent pins are inter-connected together, such as by individual links or a continuous ring or other devices, thereby providing an internal gear-type structure.

5 Claims, 5 Drawing Figures

SUPPORTED PIN-TYPE GEAR STRUCTURE

BACKGROUND OF THE INVENTION

According to certain prior art proposals chain-type gear devices are provided wherein a chain is stretched over an outer tooth wheel, and strained less than its elastic limit to thereby provide a rigid type of gear device for meshing with the teeth on a smaller tooth wheel disposed internally thereof. This technique works quite well in many applications and is especially an advantage over other chain-type gear devices wherein there is a certain amount of flexibility inherent in the device. The so called strained device was an advance in the art in so far as it removed this flexibility, thus reducing the tendency of the chain to skew or become improperly aligned under heavy loads.

However, even the strained chain device has a certain tendency to skew or twist under loading, especially in very heavy load applications over an extended period of time. This is particularly true when there is required a rather wide chain to provide the proper size for the smaller tooth wheel, necessitating a rather long centilevered sipport, thereby creating a great opportunity for skewing or canting even when the chain was stressed is being applied. Thus, while the strained chained device is an improvement over other prior art chain-type gear devices, there still are certain areas where it is not entirely satisfactory.

SUMMARY OF THE PRESENT INVENTION

According to the present invention, an improved gear member is provided which includes a support element having a flat face thereon. A plurality of pin means are provided, having one end secured to said support element and extending from the flat face thereof. The pin means being radially positioned and circumferentially spaced from each other to define a circular pattern. Link means are provided which interconnects the free end of each pin means with at least one adjacent pin means whereby to define a geat member in which the pin means are firmly supported and define a device extremely resistant to skewing or movement even under extreme loads.

DESCRIPTION OF THE PREFERRED EMBODIMENT

Figure 1:
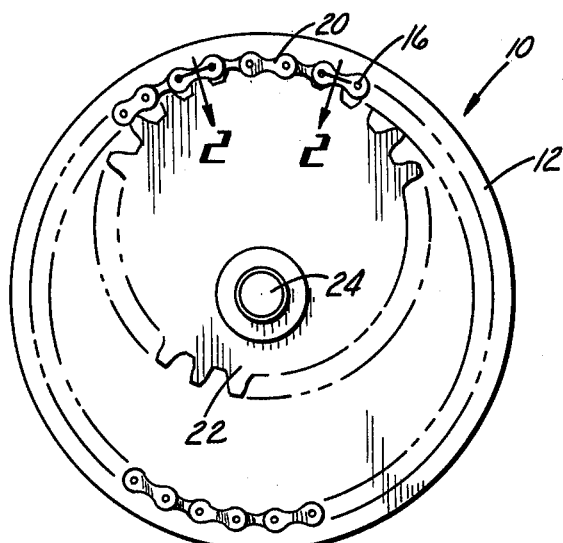
FIG. 1 is an elevational view of a gear assembly according to this invention.
Figure 2:
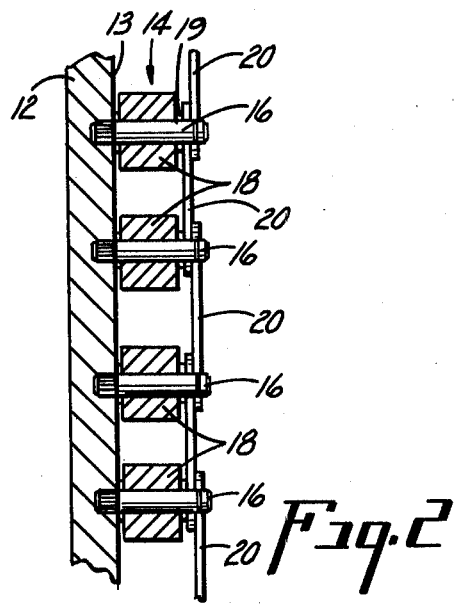
FIG. 2 is a sectional view taken substantially along the plane designated by the line 2—2 of FIG. 1.

Referring now to the drawing, for the present to FIGS. 1 and 2, a gear assembly according to the present invention is shown and designated generally by the reference character 10. The gear assembly includes a main disc 12 having a flat face 13 on one side thereof. The main disc 12 has mounted thereon a plurality of roller assemblies 14 which are circumferentially spaced with respect to each other and radially positioned to form a circular pattern around the face 13 of the disc 12.

The roller assemblies 14 include pins 16 which are supported in apertures 17 extending in from the face 13 into the body of the main disc 12. Preferably, these are tight fits with the ends of the pins preferably being knurled as shown in FIG. 2.

A roller 18 is journaled for rotation on each of the pins 16. The exact configuration of the pin for proper mounting of its respective roller may vary with different types of structure, although it is preferred that there be a central groove 19 which supports the roller and prevents its axial movement but which allows the roller to freely rotate.

Each of the pins 16 is inter-connected to its next adjacent pin by a link 20 which links snap over the ends of the pins as shown in FIG. 2. This type of link inter-connection is conventional and is the type used on roller chains wherein the side links are applied to inter-connect the adjacent pins in an identical manner. Thus, as shown in FIGS. 1 and 2, each pin is inter-connected to its next adjacent pin on both sides thereof, on one side by one link and the other side by the opposite side link. This main disc and roller assembly configuration, in effect, defines a gear device in which each of the pins 16 is solidly and firmly anchored into a strong structural main disc 12 at one end with the opposite ends being inter-connected to two adjacent pins to provide additional support.

Thus, a very strong gear structure is provided which has excellent resistance to twisting or moving even though it is formed from basically a cantilever structure. It is an open gear-type arrangement and is adapted to receive internally a toothed wheel such as that shown at 22 in FIG. 1. The toothed wheel 22 meshes internally with the rollers 16 in a gear arrangement and is rotatably supported on a shaft 24 which shaft is journaled for rotation. Thus, a very strong, resistant gear-type structure is provided which will carry a very heavy load without significant distortion.

Figure 3:
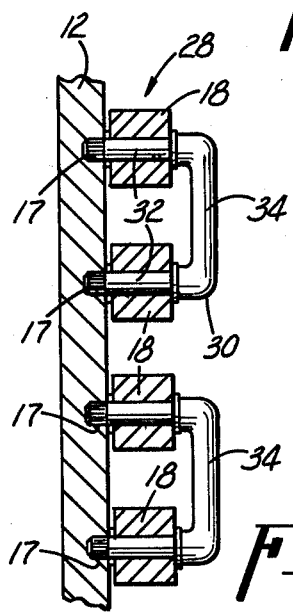
FIG. 3 is a view similar to FIG. 2 showing another embodiment of the present invention.

FIG. 3 is a sectional view similar to that of FIG. 2 showing another embodiment of a gear assembly according to this invention. In this embodiment there are roller assemblies 28 which are comprised of "U" shaped members 30, each of which has a pair of legs 32 and a central bar 34. The rollers 18 are mounted on the legs 32, which are in turn secured in the apertures 17 in the disc 12. Thus, in this embodiment, there is a rigid interconnection between two adjacent pins by means of an essentially unitary shaped structure which provides the inter-connection between two adjacent pins. In this embodiment each pin, of course, is connected only to one adjacent pin and not two as in the previous embodiment. However, the "U" shaped central section 34 provides a strong support which minimizes the tendency for twisting or distortion of the pins.

Figure 4:
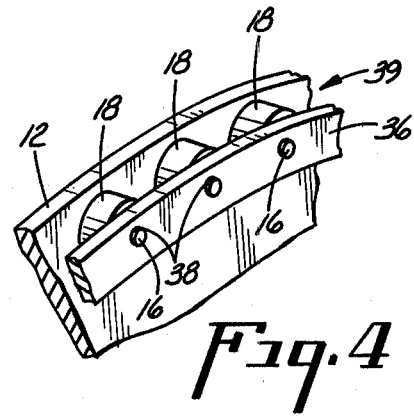
FIG. 4 is a perspective view of a portion of the assembly, showing still another embodiment of the present invention.

FIG. 4 is a perspective view of still another embodiment of a gear assembly. In this case the pins 16 and rollers 18 are similar to those shown in FIG. 2, but instead of being connected by individual links, an annular ring 36 is provided which has openings 38 therein. The opposite ends of the pins 16 are secured in the openings 38 in the central bar with the pins 16 and rollers 18 and central bar 34 constituting a roller assembly 39. This assembly provides a singular. annular, unitary structural inter-connection between all of the pins 16 both on the dic 12 as in the previous embodiment also at the opposite ends by means of the annular ring 36. This type of roller assembly also engages a toothed wheel 22 just as the embodiments of FIGS. 1, 2 and 3.

Figure 5:
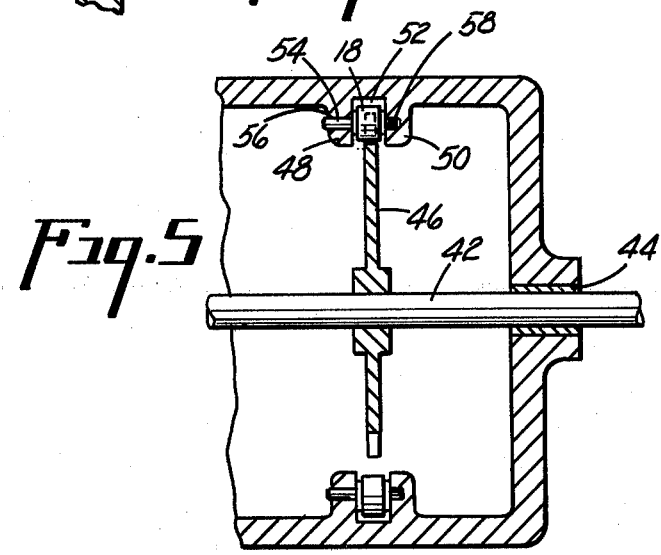
FIG. 5 is a longitudinal sectional view of the device illustrating yet another embodiment of the present invention.

In FIG. 5 a somewhat different embodiment of the present invention is shown. In this invention the casing mounting the gear, itself, serves as the support for the roller assembly. Referring specifically to FIG. 5, a gear casing 40 is provided and shown somewhat schematically in which is disposed the necessary gearing. A shaft 42 is journaled for rotation on bearing 44 in the casing and eccentrically mounted thereon is a toothed wheel 46. The casing 40 is provided with a pair of spaced flanges 48 and 50 having space 52 defined therebetween. It is in this space 52 that the roller assemblies are supported. In this case the roller assemblies include a pin 54 which extends completely through an aperature 56 in flange 48 and into a bottomed aperture 58 in the flange 50. The pin 54 may have a central configuration or groove similar to that of the pin 16 shown in the embodiment of FIG. 2 which journals roller 18 of the type previously described. The toothed wheel 46 engages the roller assembly, and by proper additional gearing, can be utilized as an internal gear member.

As can be seen from the various drawings and descriptions, all of the various embodiments provide a pin-type gear assembly wherein the pins are firmly supported in a solid member on at least one end, and the other end of the pins are inter-connected to at least one adjacent pin so as to provide strong, rigid, essentially non-yielding support for the rollers, even under heavy, continuous pressure. This then provides a very rugged, heavy-duty gear-type structure.

It is to be understood that there are other variations which are adapted to provide a structure according to the present invention; for example, rather than roller chains, silent chains with inter-connected links could be utilized in place of the rollers with the pins, themselves, providing the gear engaging surfaces and the various links providing the inter-connections, and with one end of the pins being carried by a solid member.

What is claimed is:

1. A gear member comprising a support element having a flat face thereon,
    a plurality of pin means, each having one end secured to said support element and extending from said flat face thereof, said pin means being radially positioned and circumferentially spaced from each other to define a circular pattern,
    and link means inter-connecting the free end of each pin means with the free end of both adjacent pin means
    whereby to define a gear member.

2. The invention as defined in claim 1 wherein the pin means includes roller means.

3. The invention as defined in claim 1 wherein the pin and link means are components of roller chain.

4. The invention as defined in claim 1 wherein the pin and link means are components of link chain.

5. A gear member comprising a support element having a flat face thereon,
    a plurality of pin means, each having one end secured to said support element and extending from said flat face thereof, said pin means being radially positioned and circumferentially spaced from each other to define a circular pattern,
    said pin means being formed in pairs with integral means interconnecting the free ends of both of the pins in each pair.

* * * * *